United States Patent [19]
Signoret et al.

[11] Patent Number: 4,960,249
[45] Date of Patent: Oct. 2, 1990

[54] CONTROLLED VALVE WITH POSSIBILITY OF AUTONOMOUS OPENING AND AIRCRAFT WITH A VALVE OF THIS TYPE

[75] Inventors: Jacques Signoret, Toulouse; Jacques Fraisse, Auzielle; Bruno Baroux, Toulouse; Francis Carla, St. Orens de Gameville, all of France

[73] Assignee: Abg Semca, Toulouse, France

[21] Appl. No.: 356,212

[22] Filed: May 24, 1989

[30] Foreign Application Priority Data

May 27, 1988 [FR] France .................. 88 07082

[51] Int. Cl.⁵ ........................... B64D 13/00
[52] U.S. Cl. .................. 244/118.5; 244/129.5; 98/1.5
[58] Field of Search ............. 244/118.5, 129.1, 1 R; 137/523; 251/215; 98/1.5

[56] References Cited

U.S. PATENT DOCUMENTS 2,407,540  4/1943  Del Mar .
3,544,045  12/1970  Butscher .
3,740,006  6/1973  Maher .

FOREIGN PATENT DOCUMENTS 1568448  5/1969  France .
1568449  5/1969  France .
2238880  2/1975  France .
2244953  4/1975  France .

Primary Examiner—Galen Barefoot
Attorney, Agent, or Firm—Oblon, Spivak, McClelland, Maier & Neustadt

[57] ABSTRACT

A controlled valve with the possibility of autonomous opening and an aircraft having a valve of this type are disclosed. The controlled valve enables the regulation of presures or flow rates. Furthermore, the disclosed control valve can open autonomously under the effect of a pressure difference exceeding a pre-determined threshold. Thus, it enables fast balancing of pressures if the pressure difference should exceed a threshold beyond which, for example, an installation could be in danger. The disclosed device can be applied to any device for the regulation of pressure and/or flow rate between a chamber and the exterior or between two chambers having a safety balancing device. The disclosure can be applied notably in aeronautical construction, the construction of petroleum refineries, fluid distribution devices and chemical reactors.

11 Claims, 4 Drawing Sheets

CONTROLLED VALVE WITH POSSIBILITY OF AUTONOMOUS OPENING AND AIRCRAFT WITH A VALVE OF THIS TYPE

BACKGROUND OF THE INVENTION

1. Field of the Invention

The invention relates chiefly to a controlled valve (defined herein as a valve that operates under a control applied to it) with the possibility of autonomous opening, and an aircraft comprising a controlled valve of this type.

2. Description of the Prior Art

There are prior art controlled valves which, under command or actuation, make it possible to let through a desired flow rate of a fluid between, for example, two chambers within which there are different pressures prevailing. The prior art type controlled valves enable the regulation of flow rates or pressures. To enable stable regulation, the controlled valves are designed to work in a determined range of flow rates. Thus, it is not possible, upon command, for example in the event of trouble, to get the pressures balanced by fast and complete opening of the controlled valve. Furthermore, the prior art type controlled valves act only upon external actuation. Thus, the malfunctioning of the external actuating device makes the controlled valve completely ineffective.

Thus, in the case of the most common uses, there are no safety means available to balance the pressures. In advanced technologies, such as, for example, in aeronautics, clack valves (defined herein as valves that open and shut automatically under pressure applied to them) are used: these clack valves are designed to open if the difference in pressure between their two faces goes beyond a predetermined threshold.

However, it turns out that the fact of having a clack valve or a controlled valve on a partition between, for example, two chambers or between one chamber and the outside, raises major problems. Firstly, there should be the space needed for the controlled valve and the clack valve. This is not always the case, notably if the controlled valves and clack valves have to be placed, for example, on a piping system connecting the tubes of chemical reactors or points of, for example, a petroleum distillation tower.

Furthermore, the fact of making an opening needed for the controlled valve and the clack valve to pass through embrittles the wall. This embrittlement could be partially compensated for by a structure which is, for example, metallic, positioned around the controlled valve and the clack valve. However this metallic structure is costly and heavy. The additional weight has particularly serious implications in the case of aircraft manufacturing.

The French patent application No. FR-A-88 05068, not published on the filing date of the present application, describes a controlled valve capable of opening autonomously under the effect of a pressure difference that exceeds a predetermined threshold.

FIG. 8 of the above mentioned patent application describes a valve with two thrust recovery flaps comprising a telescopic connecting rod that enables the mechanical uncoupling of two flaps and, hence, the autonomous opening of one of the flaps under the effect of a pressure difference that exceeds a threshold.

An object of the present invention is an improvement in a valve with two thrust recovery flaps and autonomous opening, if the pressure difference exceeds a threshold.

In the preferred embodiment of the valve according to the present invention, the rod providing for the coupling of the two flaps is rigid. However, at least one of the flaps can rotate on its axis, to open automatically if the difference in pressures, for example in a predetermined direction, exceeds a threshold.

The joining, during normal operation, of the two flaps, is provided, for example, by the weight of the flap and/or by a spring.

The replacement of the telescopic connection rod by a rigid connection rod makes it possible to improve operating safety and reduce wear and tear.

SUMMARY OF THE INVENTION

The invention consists of a controlled valve comprising means enabling its automatic, autonomous opening when the difference in pressure on the two faces exceeds a threshold. These means prevent the opening of the controlled valve so long as the threshold of the pressure difference has not been reached. The opening takes place automatically when the forces resulting from the difference in pressure are no longer balanced by the forces keeping the controlled valve either closed or partially opened. The opening of the controlled valve, so long as the difference in pressure has not reached the desired threshold, is prevented, for example, by the weight of the controlled valve, by springs, by magnets and/or by electromagnets. The valve is opened to the full extent either by translation or by rotation, advantageously on a single flap of the controlled valve.

In one alternative embodiment, the opening of the controlled valve is not complete but, in any case, it is sufficient to achieve a quick balancing of pressures.

The device according to the present invention enables the number of holes, that have to be made in the wall supporting it, to be limited to only one. Thus, the embrittlement of the wall is minimized and the weight is reduced by the elimination of a structure surrounding the opening while, at the same time, reducing the cost of fabrication. Furthermore, in cases where the available surface is limited, the device according to the present invention enables the making of a single opening which is bigger, instead of two openings, one designed for the controlled valve and the other for the clack valve. Thus, with the device according to the present invention, it is possible to make controlled valves having greater exchange surfaces and, thereby, to improve the working and the safety of the device.

The invention concerns a controlled value such as is described in the claims 1 to 8 hereinafter.

The invention also concerns an aircraft such as is described in the claims 9 to 11 hereinafter.

BRIEF DESCRIPTION OF THE DRAWINGS

The invention will be better understood from the following description and the appended figures, given as non-restrictive examples. Of these figures:

In FIGS. 1 to 4 the same references are used to designate the same elements.

DESCRIPTION OF A PREFERRED EMBODIMENT

Figure 1:
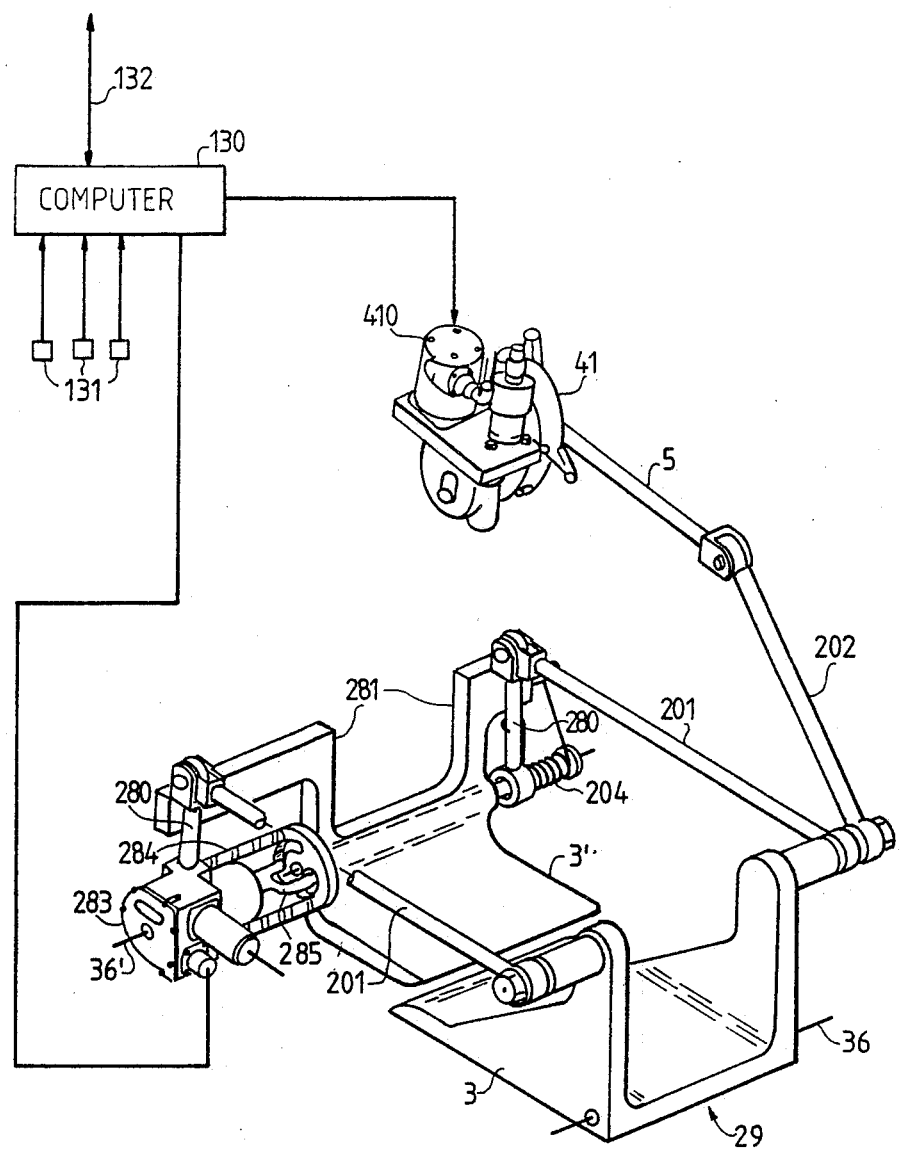
FIG. 1 is a drawing showing a first embodiment of a device according to the present invention.

FIG. 1 shows a partially open valve 29, in normal operation controlled by a computer 130 connected, for example, to pressure-measuring means 131 and/or by a link 132 to other computers.

The controlled valve of FIG. 1 has a flap 3 for which the opening, upon actuation, is obtained by a set of connecting rods 5, 202, connecting the flap to an actuator 41. The actuator 41 can be driven by a motor or a jack 410. In the example of FIG. 1, the opening is done downwards by rotation on the axis 36.

The controlled valve 29 has a second flap 3'. The flap 3' is driven by a connecting rod 201 connected to the connecting rods 4, 5, 201, providing for the opening of the flap 3. The flap 3' opens towards the top of FIG. 1.

The original feature of the controlled valve 29 according to the present invention, as compared with a prior art pressure recovery valve, lies in the fact that at least one flap, for example 3', can rotate on its axis 36' under the effect of the pressure exerted on the flap 3'.

However, during normal operation, it is vital to ensure the desired opening to maintain the mechanical coupling between the flaps 3 and 3'.

In the preferred embodiment of the valve 29 according to the invention, the coupling is provided by the weight of the flap 3' and by a pull-back string 204. The spring 204 presses the flap 3' against the driving connection rod 280. In the preferred embodiment, illustrated in the FIGURES, the flap 3' has a stop 281 perpendicular to the base of the flap 3'. The connection rod 280 leans on the stop 281, with the spring 204 blocking this stop against the connection rod 280. To obtain opening, the motor 410 should prevail over the pull-back force exerted by the spring 204.

It is clearly possible, without going beyond the scope of the present invention, to let it rotate freely on the axis 36, downwards with respect to the FIGURE, and to provide the flap 3 with a pull-back spring.

Thus, the controlled valve can open in both directions, automatically and autonomously, under the effect of a pressure difference as soon as a threshold is exceeded.

Controlled valves having at least one flap which is free to rotate on its axis and with two springs acting in contrary directions do not go beyond the scope of the present invention. In this exemplary embodiment too, the opening of the valve under normal operation is imposed by the position of the connection rod 280.

Figure 2:
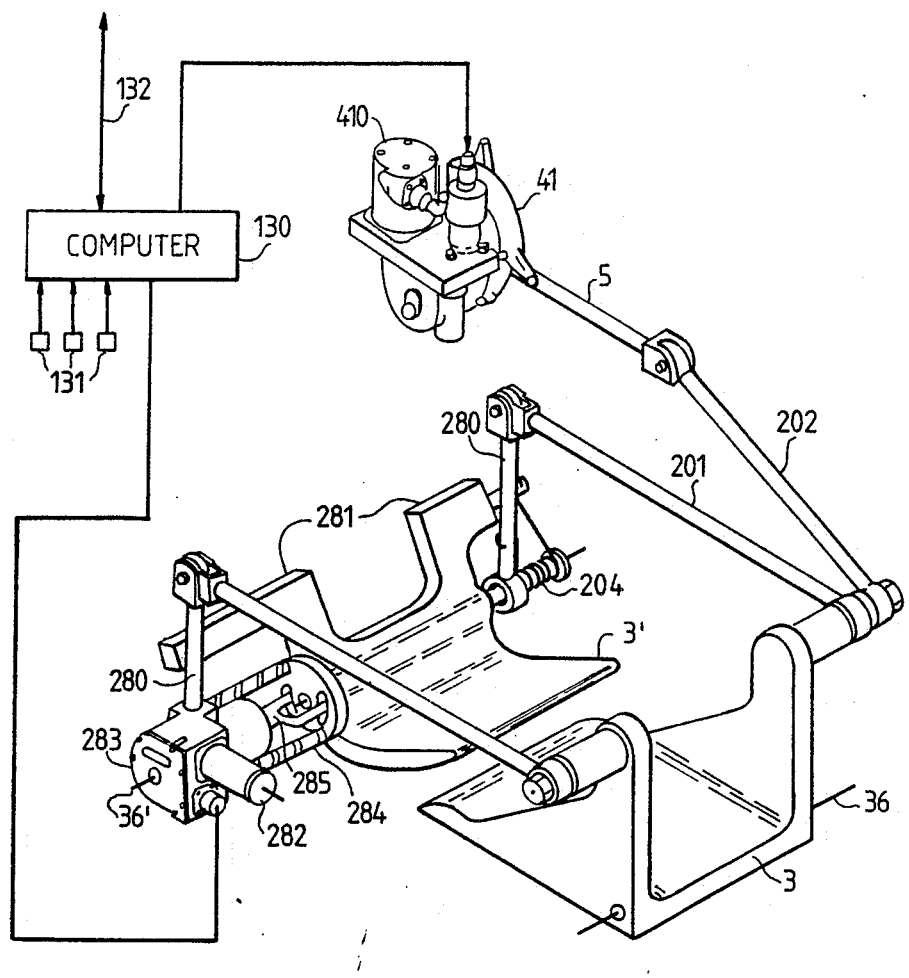
FIG. 2 is a drawing showing the device of FIG. 1 in the autonomously opened position.

FIG. 2 shows the working of the valve 29 when there is a pressure difference between the upper face and the lower face of the flaps 3 and 3'. If this pressure difference exceeds a predetermined threshold, the spring 204 is no longer capable of pressing the stop 281 against the connection rod 280. Thus, an opening of the flap 3' is obtained, enabling a balancing of pressure. When the difference in pressure between the two faces of the flaps of the valve 29 has fallen below the threshold, for example following the balancing of pressure, the spring 204 presses the stop 204 against the connection rod 281. Thus, depending on the position of the connection rod 280 (which depends on the opening of the valve 29 controlled, for example, by the computer 130), the spring 204 partially or totally shuts the valve 29.

To obtain an opening threshold of the valve 29, it is possible to bring into play, for example, the pull-back force of the spring 204 as a function of the weight and area of the flap.

It is clearly understood that the use of other means to obtain the pull-back force such as, for example, magnets or electromagnets, does not go beyond the scope of the present invention.

Advantageously, the valve 29 has means for being locked in shut position to enable hermetic sealing.

Figure 3:
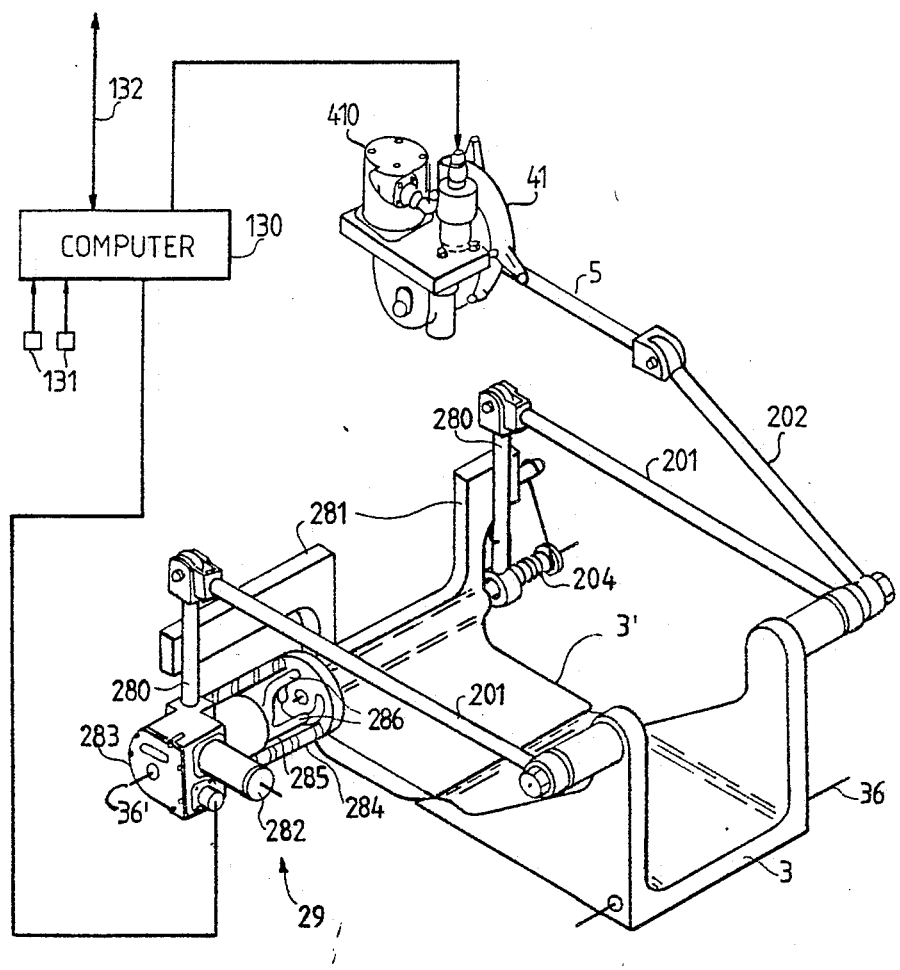
FIG. 3 is a drawing showing the device of FIG. 1 locked in closed position.

The use of the locking means is illustrated in FIG. 3. The locking means have, for example, a part 284 which is solidly joined to the flap 3', a locking piece 285 and an actuator 283.

In the embodiment illustrated in the FIGURES, the part 284 has two hollows or openings 286. In the hollows, there is placed the locking piece 285 which is, for example, fork-shaped.

During normal operation, the fork is placed in a position that does not hamper the rotation of the flap 3' on the axis 36'.

Upon command, the actuator 283 causes the rotation of the locking piece 285 to close the valve. Advantageously, the actuator 283 is an irreversible actuator that keeps the valve 29 shut, even when there is no control signal of any kind.

In the exemplary embodiment illustrated in the FIGURES, the actuator is put into operation by a motor 282, upon command coming from the computer 130. The shutting instruction is transmitted to the computer 130, for example by the line 132.

Figure 4:
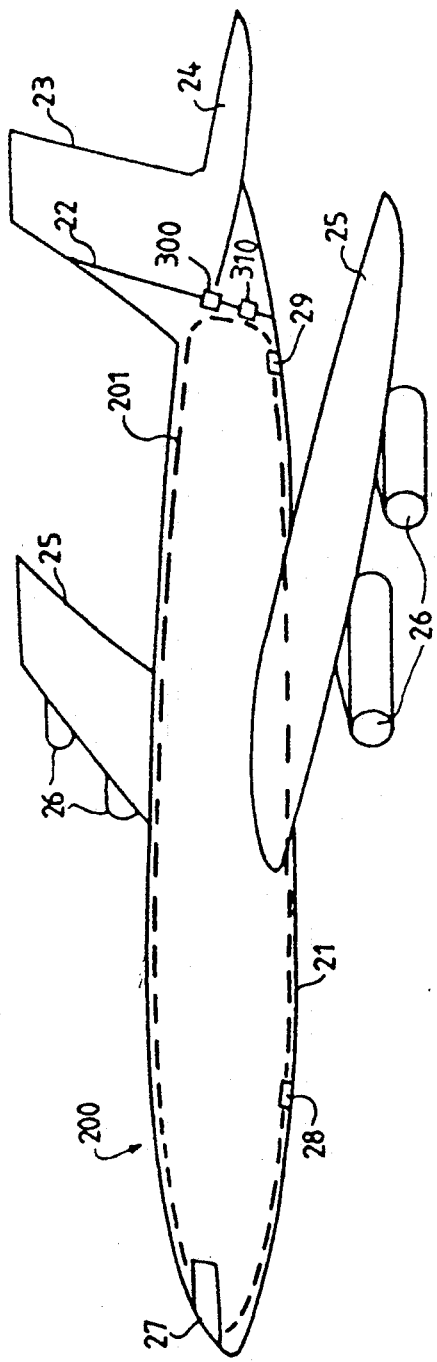
FIG. 4 is a drawing showing an aircraft according to the present invention.

FIG. 4 shows an aircraft 200 according to the present invention. The aircraft 200 has a pressurized chamber 201, two wings 25, for example four engines 26, a rudder 23, two tail units 24 and a cockpit 27.

The pressurized chamber 201 is demarcated by the external structure 21 of the aircraft, called the skin, and by a rear partition 22. The rear partition 22 is relatively brittle to reduce the mass of the aircraft. This pressurized chamber should have two safety valves 300, 310 responsible for limiting, under excess pressure and depression, the pressure difference between the pressurized chamber and the exterior and, thus, for preventing any deformation of the structure of the aircraft.

This pressure difference may arise, under excess pressure, from a regulation malfunction and, under depression, from a rapid change in altitude (urgent descent) for example.

It is sometimes necessary to add a further element to the two safety valves if these are not enough to ensure all the safety systems (for reasons of bulk, namely of space needed to house the valves). In prior art aircraft, a depression clack valve is then added. This depression clack valve makes it possible to cover cases of malfunctioning in one safety valve and to provide normal conditions of safety with the two safety valves.

The aircraft 200 further has a regulation valve 28 and a ventilation valve 29. The regulation valve is designed to perform what are called "flight sequences" namely, it is designed to regulate the internal pressure so as to ensure the comfort of the passengers. The ventilation valve 29 enables complete balancing of the pressures when the aircraft is at a stop. It must be noted that modern aircraft such as, for example, aircraft of the AIRBUS A300, A310, A320, A330 and A340 series, have large volumes and have the possibility of maneuvering with rapid changes in altitude. Thus, it is imperative to be able to balance pressure very quickly to prevent the structure of the aircraft from being damaged by an excessive difference in pressure. Now, the fact of placing a safety valve and making a hole in the skin of the aircraft presents major drawbacks. Furthermore, owing to the performance characteristics and volume of the aircraft, the safety valves 30 and 31 could prove to be inadequate in the event of trouble. Thus, it is advantageous to use the controlled valves of FIGS. 1, 2 and 3, to make the regulation valve and/or the ventilation valve to ensure, should this prove to be necessary, that the internal and external pressures are balanced.

In one exemplary embodiment, the aircraft has no safety valves 300 and 310, where the controlled valves 28 and/or 29 provide for the balancing of the safety pressure.

Advantageously, it is the ventilation valve, normally not active during flight, that would, in the event of a fast descent of the aircraft, autonomously enable the external air to enter the interior in order to achieve a balance of this type.

Advantageously, the controlled valves 28 and 29 are placed in the underside of the aircraft, beneath the waterline. Thus, the maintenance, which can be done from the bottom, is facilitated and, moreover, the flow of air-conditioning air is facilitated, the inlet of this air-conditioning air being located in the upper part of the aircraft. Thus it is essential, in order to ensure the safety of the aircraft in the case of splash-down, to enable the locking, in closed position, of the controlled valve 29. The locking is obtained by the operation of the "ditching" switch on the control panel of the aircraft.

The device according to the present invention can be applied to any device for regulating pressure and/or flow rate between a chamber and the exterior or between two chambers comprising a safety balancing device.

The invention can be applied notably to aeronautical construction, and to the construction of petroleum refineries, fluid distribution devices and chemical reactors.

What is claimed is:

1. A thrust recovery valve with two flaps having positioning means that enable it to be opened upon command, wherein at least one of the flaps can rotate on its rotational axis and get detached from the positioning means to open if the pressure difference on the two faces of the flap exceeds a predetermined threshold.

2. A controlled valve according to claim 1, comprising pull-back means that join the flap to the positioning means only if a difference in pressure between the two faces of the flap does not exceed a predetermined threshold.

3. A controlled valve according to claim 2, wherein the pull-back means comprise a spring.

4. A controlled valve according to claim 1, wherein the flap capable of opening has a stop on which a connecting rod of the positioning means takes support.

5. A controlled valve according to claim 1, wherein the positioning means include a jack.

6. A controlled valve according to claim 1, comprising means to shut and lock the valve in shut position, independently of the pressure conditions prevailing on the two sides of the flap.

7. A controlled valve according to claim 6, wherein the shutting and locking means comprise a part solidly joined to the flap, capable of getting detached from the positioning means, said part having openings wherein a locking piece can be placed.

8. A controlled valve according to claim 1, wherein the shutting and locking means comprise a jack capable, upon actuation, of making the locking piece rotate in the openings.

9. An aircraft according to claim 8, wherein the controlled valve is a ventilation valve designed to balance the external and internal pressures when the aircraft is on the ground.

10. An aircraft according to claim 8 wherein, under the effect of an excessive external pressure, the controlled valve opens towards the inside of the aircraft.

11. A controlled valve according to claim 1, wherein said controlled valve has two flaps connected by a connecting rod comprising means enabling the variation of the length of the connecting rod under the effect of a difference in pressure on the two faces of the controlled valve.

* * * * *